2 Sheets--Sheet 1.

J. L. & W. SKELLY.
Grain-Binders.

No. 155,046. Patented Sept. 15, 1874.

WITNESSES:

INVENTOR:
BY
ATTORNEYS.

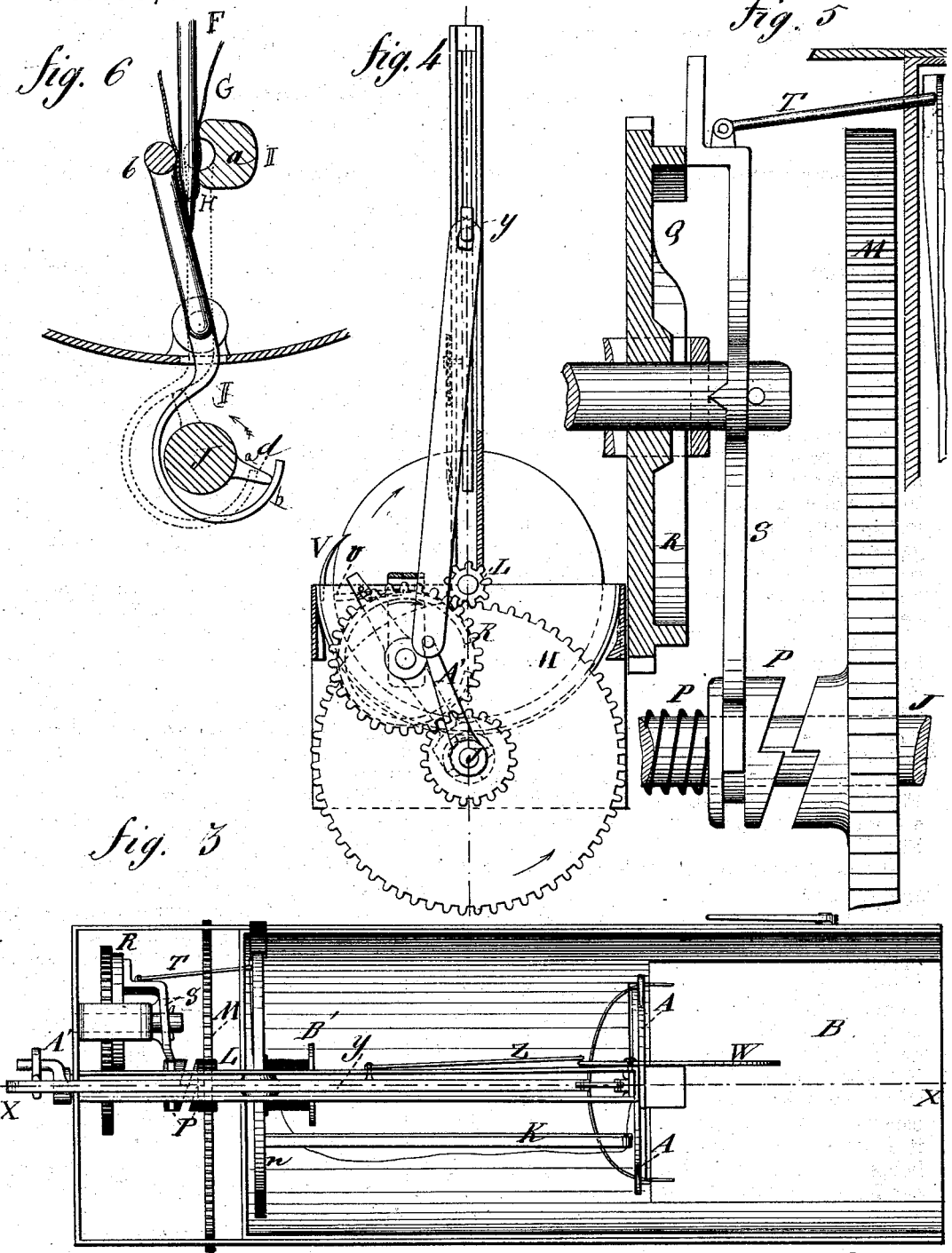

UNITED STATES PATENT OFFICE.

JAMES L. SKELLY AND WILLIAM SKELLY, OF SPARTA, ILLINOIS.

IMPROVEMENT IN GRAIN-BINDERS.

Specification forming part of Letters Patent No. 155,046, dated September 15, 1874; application filed June 6, 1874.

*To all whom it may concern:*

Be it known that we, JAMES L. SKELLY and WILLIAM SKELLY, of Sparta, in the county of Randolph and State of Illinois, have invented a new and Improved Grain-Binder, of which the following is a specification:

Our invention consists of a needle for passing the twine through the gavel, a clamp or loop-catcher for receiving and holding the twine while the needle goes back, and an arm for carrying the twine around the bundle, together with apparatus for operating them, in combination with clamps for compressing and holding the bundle while being bound, all as hereinafter described.

Figure 1:
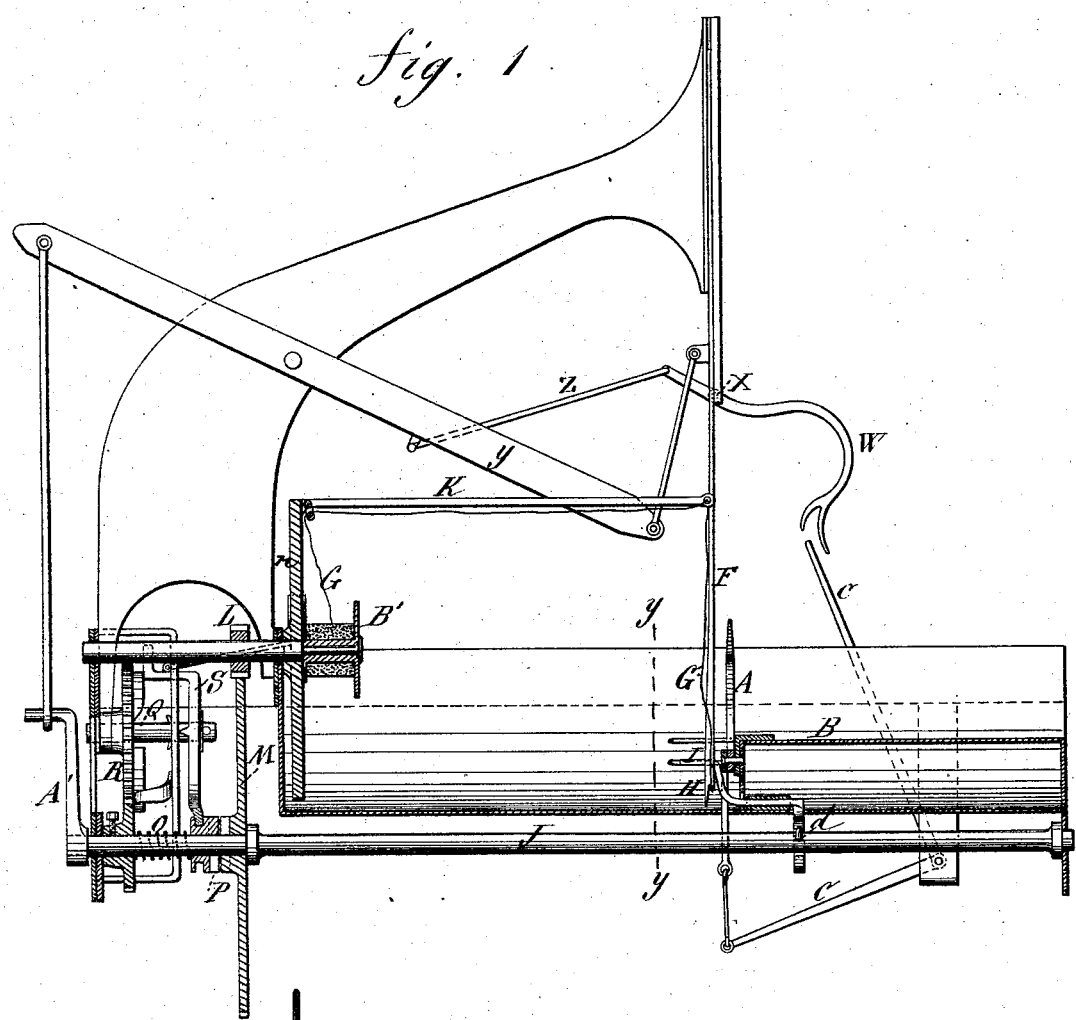
Figure 2:
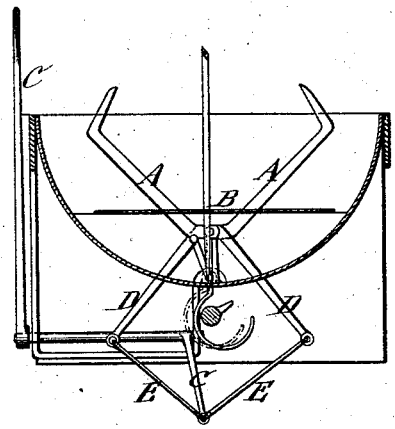

Figure 1 is a longitudinal sectional elevation of our improved grain-binder, taken on the line $x$ $x$ of Figs. 3 and 4. Fig. 2 is a transverse section taken on the line $y$ $y$ of Fig. 1. Fig. 3 is a plan view. Fig. 4 is an end elevation with some parts shown in section. Fig. 5 is a detail section on line $x$ $x$, Fig. 3, on an enlarged scale; and Fig. 6 is an enlarged detail section on the line $y$ $y$ of Fig. 1.

Similar letters of reference indicate corresponding parts.

The gavel is to be placed between the compressing-arms A, on the platforms B, so as to project beyond the needle about half its length. The arms are then to be worked to compress the gavel, and hold it to be bound, being operated by the lever C, to which they are suitably connected by arms D and links E. The needle F then goes down through the gavel, taking the twine G in its notch H, carrying it through the gavel, and delivering it into the loop-catcher I, which seizes and holds it when the needle goes back, said catcher consisting of a stationary jaw, $a$, and a movable one, $b$, which are closed on the twine by a cam, $d$, on the main shaft J. When the needle goes back the twine-carrying arm K makes a couple of revolutions around the gavel, winding the twine around it, said arm being turned by the pinion L and wheel M, the latter being for a short time clutched with the driving-shaft by the spring O and clutch P, while the notch Q of cam-wheel R is passing the lever S, which throws the clutch out after turning the yarn-carrier. The rod T, on the lever S, and a rib, U, on the side of the disk or head $n$, stop the arm after the clutch disconnects, and, together with a spring-pawl, V, hold it in the required position. A forked lever, W, pivoted on the needle-race at X, and connected to the rock-lever Y by the rod Z, then comes down and presses the twine, so that the part coming through the eye of the arm K only will be caught by the needle, which then goes down again and carries the twine through the gavel to the loop-catcher a second time, after which the twine is cut, the arms A released, and the bundle thrown out of the machine.

The needle is operated by the rock-lever Y, which is worked by the crank A' of the driving-shaft.

The twine-bobbin B' is arranged on the axis of the arm K, so as to turn loosely to allow the twine to be drawn off, as required.

Having thus described our invention, we claim as new and desire to secure by Letters Patent—

1. The combination, with receiver and compressor, of the needle, having notch H, all relatively arranged, as shown and described, to allow the needle to take the thread through the gavel while compressed in the receiver.

2. The combination, with receiver, needle, and clamp, of the wrapper K, turning two or more times around the gavel, as and for the purpose set forth.

3. A compressor, consisting of arms A D, pivoted together and to the receiver, the links E, and the lever C, all arranged substantially as and for the purpose specified.

4. The twine-adjusting lever W, combined with the twine-carrier and needle, as shown and described.

5. The jaws $a$ $b$ and cam $d$, combined with driving-shaft J and needle F, as and for the purpose set forth.

6. The combination, with yarn-carrier, of cam-wheel R, lever S, clutch P, spring O, rod T, flange U, spring-pawl V, wheel M, and pinion L, as and for the purpose specified.

JAMES L. SKELLY.
WILLIAM SKELLY.

Witnesses:
CHARLES W. MILLER,
JOSEPH CARR.